United States Patent Office 3,144,452
Patented Aug. 11, 1964

3,144,452
POLYMERISATION OF ORGANIC ISOCYANATES
James Harry Wild and Francis Edward Gervase Tate, Manchester, England, assignors to Imperial Chemical Industries Limited, London, England, a corporation of Great Britain
No Drawing. Filed Jan. 19, 1962, Ser. No. 167,436
9 Claims. (Cl. 260—248)

This invention relates to the polymerisation of aryl isocyanates and the present application is a continuation-in-part of Serial No. 46,049.

It has already been proposed to polymerise isocyanates, with the production of the dimeric, uretedione form by contacting the isocyanates with pyridine or with a mono- or di-methyl pyridine, it is also known to polymerise isocyanates to the trimeric form in which the iso-cyanurate ring structure is present, as represented below,

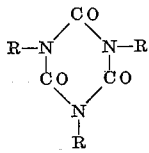

wherein R is an aromatic substituent which may or may not carry an NCO group. It has now been found that certain substituted pyridines are effective catalysts for these polymerisations.

Thus according to the present invention there is provided a process for polymerising aryl isocyanates containing at least one isocyanate group preferably having no substituent ortho thereto, which comprises contacting such isocyanates with a 3- and/or 4- substituted pyridine of such basicity that, when substituted in benzoic acid in the meta or para position respectively, said 3- and/or 4- substituent increases the $pK_a$ value of the substituted benzoic acid, measured in water at 25° C. to greater than 4.35.

Any 3- and/or 4-substituted pyridine of the specified basicity may be used as catalyst, provided the substituent does not react with the isocyanate group. Especially valuable substituted pyridines are 4-alkoxy pyridines wherein the alkoxy group is for example methoxy, ethoxy or propoxy, 4-aralkoxy pyridines wherein the aralkoxy group is for example benzyloxy, 3- and 4-dialkylamino pyridines wherein the alkyl group is for example methyl or ethyl, 3- and 4-alkarylamino pyridines such as the 3- and 4-methylphenylaminopyridines, and pyridines containing a substituent of the type

in the 3- or 4-positions, wherein X represents an aliphatic chain with or without a hetero-link; thus for example the substituent may be a morpholino, pyrrolidino or piperidino-group.

Any aryl mono or polyisocyanate preferably containing no substituent ortho to an isocyanate group at which polymerisation is to occur can be polymerised according to the process of this invention; the presence of such an ortho substituent tends to inhibit polymerisation, especially polymerisation to the dimeric form. Thus for example there may be used phenyl isocyanate,
p-chlorophenylisocyanate,
p-nitrophenylisocyanate,
m- and p-cyanophenylisocyanate,
2-naphthylisocyanate,
2:4-toluenediisocyanate,
4-chloro-1:3-phenylenediisocyanate,
2-chloro-1:4-phenylenediisocyanate,
4-methoxy-1:3-phenylene diisocyanate,
m-phenylenediisocyanate,
p-phenylenediisocyanate,
4:4'-diisocyanatodiphenylmethane,
3-methyl-4:4'-diisocyanatodiphenyl-methane,
4:4'-diisocyanatodiphenyl ether,
2:4:4'-trisocyanatodiphenylether,
2:4:4'-triisocyanatodiphenylmethane,
2:4:6-triisocyanatotoluene and in general all the isocyanates where polymerisation has already been achieved with the use of other catalysts.

The course taken by the polymerisation is largely determined by the choice of polymerisation conditions. In general the dimeric, uretedione form is produced under mild reaction conditions, and can only be obtained when no substituent is present, ortho to the isocyanate group to be polymerised. Lower temperatures, reduced amounts of catalyst, and the selection of an inert solvent in which to conduct the reaction such that the dimeric form of the isocyanate is only sparingly soluble therein, favour the formation of the dimeric form. The isocyanurate form of polymer on the other hand is predominant at high reaction temperatures and its formation is favoured by increased amounts of catalyst and the selection of an inert reaction medium which has appreciable solvent power for the dimeric form of polymer. Although as already stated polymerisation conditions greatly influence the course of the reaction, it is not unusual for the dimeric uretedione form to be present in the reaction mixture together with the trimeric isocyanurate form at the end of the reaction time.

The polymerisation process may be performed at a temperature between —40° C. and 140° C. Where the dimeric form of polymer is desired the temperature will usually be between 0° C. and 100° C. but is preferably about normal atmospheric temperature. Where the trimeric form is desired the temperature will usually be between 0° C. and 140° C. but is preferably above normal atmospheric temperature.

The reaction may be carried out in the presence or absence of solvents which are inert with respect to isocyanates for example chlorobenzene, aromatic and aliphatic hydrocarbons, and others. The reaction which results in the formation of the uretedione form is reversible so that where a solvent is used, the reaction is influenced as mentioned above by the solubility of this form of polymer in the solvent.

By the process of this invention organic isocyanates may be conveniently polymerised without the use of poisonous or malodorous or otherwise objectionable catalysts, which the activity of the catalysts is such that there is little difficulty in controlling the exothermic polymerisation. The polymerisation may be instantly stopped, if desired, by the addition of acyl halides or of Friedel-Crafts catalyst such as boron trifluoride or its complexes in substantially equimolecular amount with respect to the catalyst. Furthermore, the amount of catalyst necessary is small compared with the amount of pyridine or methyl pyridines necessary to polymerise the isocyanate at a similar rate. The amount of catalyst may be varied to control the rate of polymerisation but will in general be between .005% and 15% of the weight of isocyanate used where dimerisation is desired, and between 0.05% and 15% where trimerisation is desired.

The polymerisation isocyanates, which have the advantage of low toxicity due to the absence of volatile monomers, may be used in place of or in addition to isocyanates for the wide variety of purposes, the dimeric forms, and those trimeric forms which contain free isocyanate groups may be used for example as adhesives, curing agents for resins, and for the manufacture of polyurethane solid or cellular articles.

The invention is illustrated but not limited by the following examples in which parts and percentages are by weight.

EXAMPLE 1

To 57 parts of phenyl isocyanate was added 1 part of 4-ethoxypyridine. After 22 hours standing at room temperature of 23° C. the mixture had set to a hard solid and analysis indicated that the compound had been converted completely to N:N-diphenyl uretedione.

EXAMPLE 2

To 57 parts of phenylisocyanate was added a solution of 1 part of 4-dimethylaminopyridine dissolved in 33 parts of chlorobenzene. After 1 hour standing at room temperature of 23° C. the solution had set to a solid mass and analysis indicated that 58% of the isocyanate had been converted to uretedione.

EXAMPLE 3

To 26 parts of 2:4-toluene diisocyanate was added 1 part of 4-ethoxypyridine. The liquid solidified within a few minutes and after 2 and a half hours standing at room temperature analysis of the product indicated that the isocyanate had been completely converted to N:N'-bis-(4-methyl-3-isocyanatophenyl)uretedione.

EXAMPLE 4

To 947 parts of 2:4-toluene diisocyanate was added a solution of one part of 4-dimethylaminopyridine in 70 parts of chlorobenzene. After 15 minutes standing at room temperature analysis indicated that 70% of the 2:4-toluenediisocyanate had been converted to the uretedione.

EXAMPLE 5

1 part of 4-dimethylaminopyridine and 128 parts of 2:4-toluenediisocyanate were dissolved in 376 parts of chlorobenzene. The system, initially at 20° C., was maintained under adiabatic conditions with stirring. The temperature rose slowly and a solid separated. The temperature reached a maximum of 37.5° C. after 30 minutes and after one hour analysis of the slurry indicated that 42% of the isocyanate had dimerised. After removing solid product by filtration a further 85 parts of the diisocyanate were added to the chlorobenzene solution. The temperature again rose reaching a maximum of 44° C. during 15 minutes. The solid product was identified as N:N'-bis-(4-methyl-3-isocyanatophenyl) uretedione by comparison of its infra-red absorption spectrum with that of an authentic sample prepared by pyridine catalysed dimerisation of 2:4-toluene diisocyanate.

EXAMPLE 6

To 179 parts of phenyl isocyanate was added a solution of 1 part of 4-N-morpholinopyridine in 248 parts of chlorobenzene.

After standing 22 hours at room temperature (22–23° C.), analysis indicated that 71.2% of the phenylisocyanate has been converted to the uretedione.

4-N-morpholinopyridine (M.Pt. 105–106° C. uncorr.; picrate M.Pt. 189–190° C. uncorr.), was prepared by the action of boiling morpholine on 4-chloropyridine-N-oxide in the presence of hydrated copper sulphate.

EXAMPLE 7

To 18 parts of phenyl isocyanate was added 1 part of 3-dimethylaminopyridine. The mixture solidified after 1 hour, and after a further 21 hours standing at room temperature, analysis indicated that 97.7% of the phenyl isocyanate had been converted to the uretedione.

The time taken for the degree of dimerisation to reach a given value varies with the isocyanate and with the solubility of the uretedione formed in the solvent used. The advantage of the substituted pyridine catalysts over pyridine itself is illustrated in the following tables, where all reactions were carried out by mixing the components at room temperature (20–24° C.).

EXAMPLE 8

*Polymerisation of Phenyl Isocyanate*

| Catalyst | Parts by weight | | | Duration of Contact in Hours | Percent of dimerisation |
|---|---|---|---|---|---|
| | Isocyanate | Catalyst | Chlorobenzene | | |
| Pyridine | 2.5 | 1 | 0 | 22 | 11 |
| 4-Ethoxypyridine | 5.7 | 1 | 0 | 22 | 100 |
| 4-Dimethylaminopyridine | 690 | 1 | 33 | 1 | 58 |
| 4-N-Morpholinopyridine | 179 | 1 | 248 | 22 | 71 |
| 3-Dimethylaminopyridine | 18 | 1 | 0 | 22 | 98 |

EXAMPLE 9

*Polymerisation of 2:4-Toluene Diisocyanate*

| Catalyst | Parts by weight | | | Duration contact in hours | Percent of dimerisation |
|---|---|---|---|---|---|
| | Isocyanates | Catalyst | Chlorobenzene | | |
| Pyridine | 26 | 1 | 0 | 2.5 | 9 |
| 4-Ethoxypyridine | 26 | 1 | 0 | 2.5 | 100 |
| 4-Dimethylaminopyridine | 964 | 1 | 70 | 0.25 | 70 |

EXAMPLE 10

1 part of 4-dimethylaminopyridine was added to a mixture of 76 parts of toluene-2:4-diisocyanate and 72 parts of dry n-butyl ether, at room temperature. The mixture was heated under reflux. After 4 hours, the mixture was allowed to cool, and 1 part of acetyl chloride was added. The infra-red absorption spectrum of the solid product obtained, showed the compound to contain both isocyanurate and uretedione carbonyl groups in approximately equal amounts. The isocyanurate structure was identified by its absorption in the infra-red at 5.83 and 7.07 microns.

EXAMPLE 11

1 part of 4-dimethylaminopyridine was added to a mixture of 191 parts of toluene-2:4-diisocyanate and 102 parts of dry ethyl acetate at room temperature. The initially formed precipitate disappeared when the mixture was heated under reflux giving an orange-red solution. After 5 hours the mixture was cooled in ice, when after a few minutes a yellow solid separated from the clear brown solution. The mixture was again heated under reflux for a further 15 hours. A brown solid separated leaving a supernatant viscous oil. The infra-red absorption spectrum of the viscous oil showed strong bands at 5.85 and 7.05 microns due to the isocyanurate ring and at 4.35 microns due to the free isocyanate groups. A weak band at 5.6 microns indicated the presence of a trace of the uretedione derived from toluene-2:4-diisocyanate.

EXAMPLE 12

1 part of 4-dimethylaminopyridine was added to a solution of 100 parts of toluene-2:4-diisocyanate in 185 parts of dry ethyl acetate. The mixture was maintained at reflux temperature for 12 hours and allowed to cool for 9½ hours, when a solid separated. The mixture was again brought to reflux temperature, when the solid dissolved, and the refluxing was continued for a further 8 hours. On cooling in ice, 1.4 parts of a precipitate formed after 15 minutes. No further increase in precipitates was noticed on standing the mixture for a further 3 days at room temperature. The catalyst was destroyed by adding an equivalent amount of boron trifluoride as its ether complex, and the reaction mixture separated from unwanted insoluble matter by decantation.

The isocyanate content of the clear supernatant liquid was determined by the method of Staff (Analyst, 71, 557, 1946) which showed that 58.3% of the original isocyanate content had been polymerised. The infra-red absorption spectrum of the solution showed strong bands at 5.82 and 7.0 microns due to the isocyanurate ring, and at 4.35 microns due to the free isocyanate groups. An extremely weak band at 5.6 microns, indicated that only traces of the dimeric form of toluene-2:4-diisocyanate were present, thus proving to those skilled in the art that any monomeric diisocyanate was present in even smaller amount.

EXAMPLE 13

1 part of 4-dimethylaminopyridine was added to 100 parts of p-tolyl isocyanate and 200 parts of dry ethyl acetate, and the mixture boiled under reflux for 24 hours. 1 part of acetyl chloride was added to the cooled mixture, which was then shaken with petroleum ether and the solid product separated from the washings by filtration. 46 parts of product which melted at 264° C. were obtained. Recrystallisation from ethanol raised the melting point to 268° C., undepressed on admixture with authentic tri-p-tolyl isocyanurate. Infra-red absorption spectrum of the product showed strong bands at 5.85 and 7.05 microns, typical of the isocyanurate ring.

EXAMPLE 14

1 part of 4-dimethylaminopyridine was added to a mixture of 100 parts of p-nitrophenylisocyanate and 200 parts of dry ethyl acetate. The mixture was maintained at reflux temperature for 24 hours, allowed to cool, and the solid product recrystallised from a mixture of ethanol and acetone. 20 parts of white microcrystals which did not melt below 350° C. were obtained. The infra-red absorption spectrum of the product and that of an authentic sample of tri-p-nitrophenyl isocyanurate were identical.

EXAMPLE 15

1 part of 4-dimethylaminopyridine was added to a mixture of 45 parts of 2-nitro-4-isocyanatotoluene and 136 parts of dry ethyl acetate, and the mixture heated to reflux temperature at which point a vigorous reaction occurred. After heating for 2½ hours, the mixture was cooled and filtered and the white residue washed with ethanol. 17 parts of a white powder which did not melt below 360° C. were obtained. The infra-red absorption spectrum of the product was typical of the isocyanurate ring and the structure tri-(3-nitro-4-methylphenyl)-iso-cyanurate was confirmed by microanalysis.

EXAMPLE 16

1 part of 4-dimethylaminopyridine was added to a mixture of 50 parts of anisole-2:4-diisocyanate and 100 parts of dry ethyl acetate and the mixture heated under reflux for 40 hours. After cooling in ice for 15 minutes the catalyst was destroyed by adding an equivalent amount of boron trifluoride as its ether complex. A small portion of the product was dried at 110° C. Its infra-red absorption spectrum showed strong bands typical of the isocyanurate ring and free isocyanate groups, a weak band, due to the uretedione ring, being scarcely perceptible. The reaction mixture was shaken with excess dry petroleum ether and filtered to separate 45 parts of a white powder which melted over the range 310–320° C. The isocyanate equivalent of the product was 227.

EXAMPLE 17

A solution of 0.9 part 4-(N-pyrrolidino)pyridine in 58.7 parts of anhydrous ethyl acetate was mixed with 223.3 parts of phenyl isocyanate. Crystals commenced to separate immediately and after 15 minutes the mixture completely solidified. After 24 hours the product was washed with dry petroleum ether (B.P. 40–60° C.) dried and weighed to give 221.1 parts of a white solid. One crystallisation from dry benzene gave white flakes melting at 176–178° C. mixed melting point with authentic N:N'-diphenyl uretedione was 176–178° C.

What we claim is:

1. In a process for polymerising an aryl isocyanate in which the isocyanate is contacted with a polymerisation catalyst under substantially anhydrous condition; the improvement comprising utilising as a catalyst a member of the group consisting of 3- and 4-substituted pyridines in which the substituents are selected from the group consisting of 4-alkoxy, 4-aralkoxy, 3- and 4-alkylarylamino, 3- and 4-dialkylamino, 3- and 4-N-morpholino, 3- and 4-N-piperidino, and 3- and 4-N-pyrrolidino, said pyridine being of such basicity that, when substituted in benzoic acid in the 3- and 4- positions respectively, said 3- and 4- substituent increases the $pK_a$ value of the substituted benzoic acid, measured in water at 25° C. to greater than 4.35.

2. The process of claim 1 in which the catalyst is 3-dimethylaminopyridine.

3. The process of claim 1 in which the catalyst is 4-dimethylaminopyridine.

4. The process of claim 1 in which the catalyst is 4-N-piperidinopyridine.

5. The process of claim 1 in which the catalyst is 4-N-morpholinopyridine.

6. The process of claim 1 in which the catalyst is 4-ethoxypyridine.

7. The process of claim 1 in which the catalyst is 4-benzyloxypyridine.

8. The process of claim 1 in which the catalyst is 4-N-pyrrolidinopyridine.

9. The process of claim 1 in which the temperature is between 0° C. and 100° C.

References Cited in the file of this patent

FOREIGN PATENTS 856,372    Great Britain _____ Dec. 14, 1960